Jan. 29, 1963   H. V. HANSEN ETAL   3,075,790
HITCH FACILITATING MEANS FOR A PLANTER OR THE LIKE
Filed March 17, 1960   2 Sheets-Sheet 1
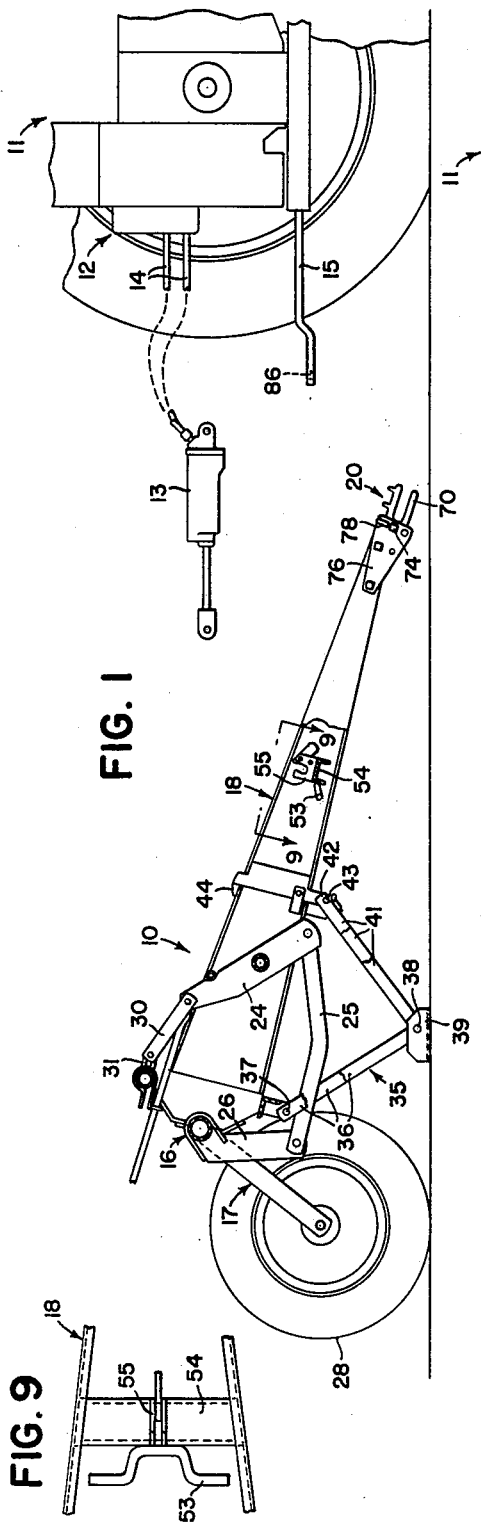
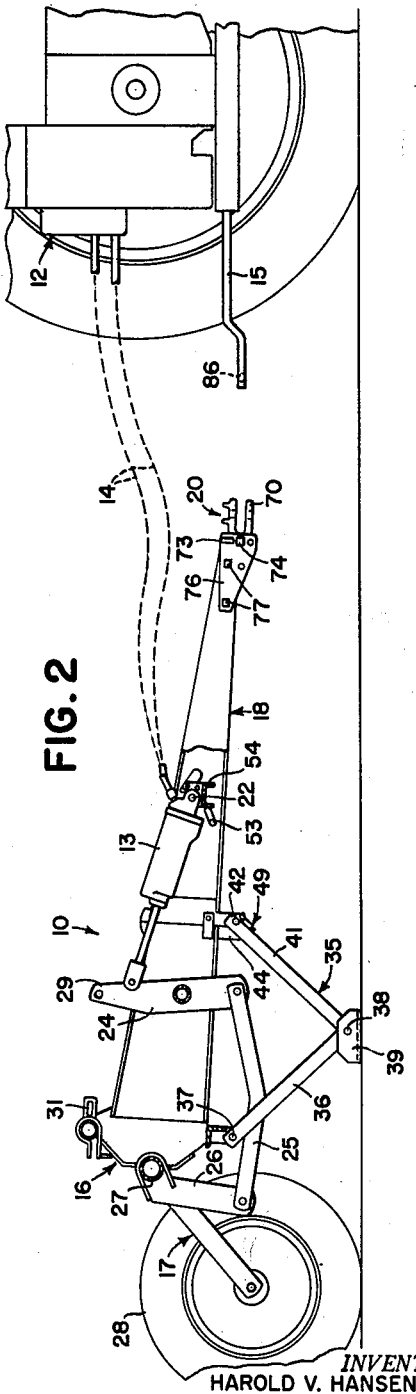
INVENTORS.
HAROLD V. HANSEN
CLIFFORD W. ODENDAHL
ATTORNEYS Jan. 29, 1963   H. V. HANSEN ETAL   3,075,790
HITCH FACILITATING MEANS FOR A PLANTER OR THE LIKE
Filed March 17, 1960   2 Sheets-Sheet 2
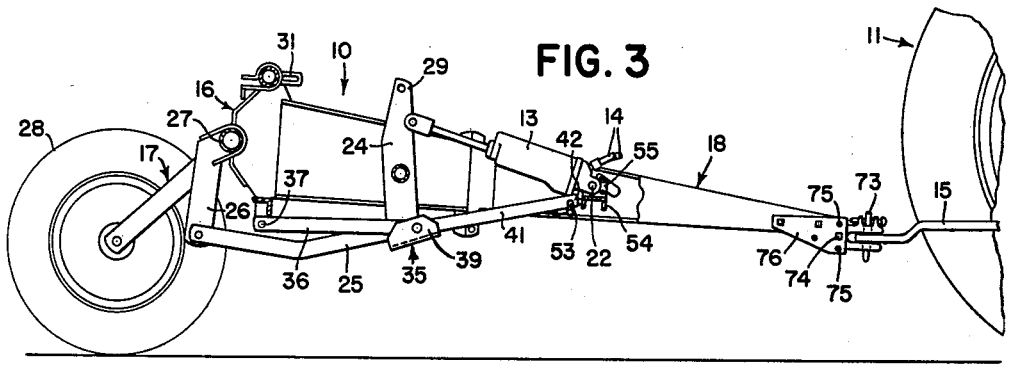
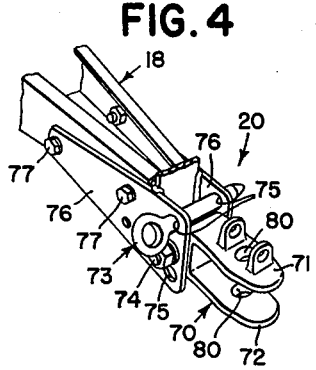
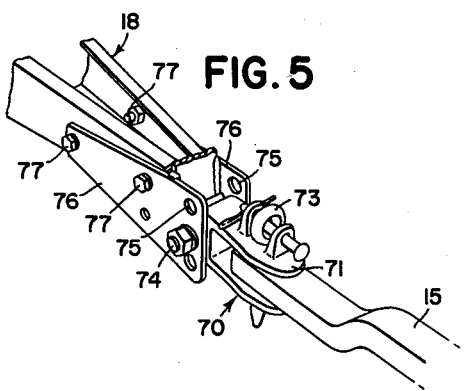
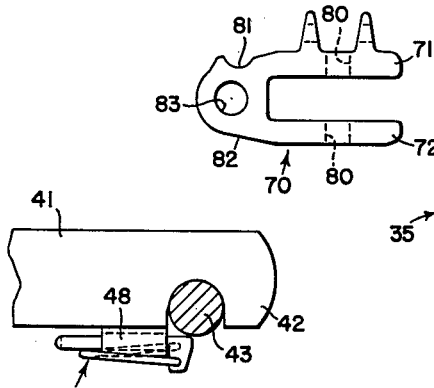
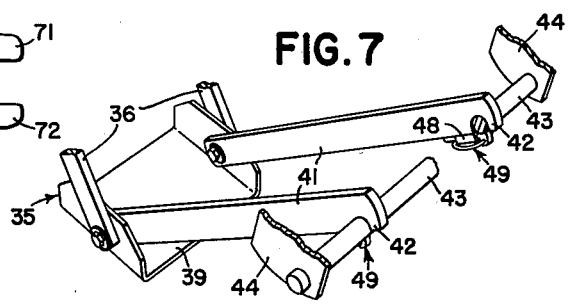
INVENTORS.
HAROLD V. HANSEN
CLIFFORD W. ODENDAHL
BY
*C. F. Parker & R. C. Johnson*
ATTORNEYS 3,075,790
HITCH FACILITATING MEANS FOR A PLANTER
OR THE LIKE
Harold V. Hansen, Moline, and Clifford W. Odendahl,
East Moline, Ill., assignors to Deere & Company,
Moline, Ill., a corporation of Delaware
Filed Mar. 17, 1960, Ser. No. 15,746
2 Claims. (Cl. 280—475)

This invention relates generally to agricultural implements and more particularly to implements of the type that are connected with a farm tractor to be propelled thereby.

The object and general nature of this invention is the provision of new and improved means to facilitate connecting the implement to the tractor. More specifically, the present invention is concerned with implements of the type that are raised and lowered by the use of a power cylinder mounted on the implement but deriving operating energy from the tractor, the power means being adapted to be operated for raising and lowering the front end of the implement to thereby facilitate hitching the front end of the implement to the tractor drawbar.

These and other objects and advantages of this invention will be apparent to those skilled in the art after a consideration of the following detailed description, taken in conjunction with the accompanying drawings, in which:

FIG. 1 is a diagrammatic side elevation of an implement and tractor combination, in which the principles of this invention have been incorporated, the implement and tractor being shown in the relative positions they occupy when backing the tractor into position to hitch the implement thereto.

FIG. 2 is a side view similar to FIG. 1, showing the implement shifted into a position to receive the tractor drawbar.

FIG. 3 is a side view showing the hitching of the implement to the tractor completed and the implement ready for use.

FIG. 4 is a fragmentary view of the hitch clevis of the implement and the locking means associated therewith for holding the clevis in a position facilitating connecting the tractor drawbar thereto.

FIG. 5 is a perspective similar to FIG. 4 showing the clevis locking means removed and the implement draft frame connected with the tractor drawbar for generally up and down swinging relative thereto.

FIG. 6 is a detail view of the clevis.

FIG. 7 is a fragmentary view showing the forward part of the stand in implement-supporting position.

FIG. 8 is an enlarged fragmentary view showing the stand leg retaining means.

FIG. 9 is a fragmentary view showing the stand lock-up cross bar.

Referring first to FIGS. 1–3, the implement is shown by way of illustration in the form of a tractor planter 10 adapted normally to be connected with a farm tractor 11 so as to swing relative to the latter about a generally transverse axis, being adapted thereby to pass over uneven terrain when required to do so, thereby swinging in a generally up and down manner about said transverse axis. The tractor 11 is generally conventional, being equipped with power lift means 12 that includes a remote cylinder 13 normally mounted on the implement that is propelled by the tractor and connected to serve some desired function thereon. The cylinder 13 is operatively connected to the power lift means of the tractor through a pair of hydraulic hoses 14.

The implement 10 comprises a main frame 16 disposed in a generally transverse relation and supported on a wheel carrier 17 that is swingable relative to the frame 16 about a generally transverse axis whenever it is desired to raise and lower the frame 16. The implement 10 also includes a forwardly extending hitch frame 18 that at its rear portion forms a rigid part of the frame 16 and at its forward portion is connected with the drawbar of the tractor by clevis means 20 to which more detailed reference will be made below. When the power cylinder 13 is mounted on the implement (FIGS. 2 and 3), it is pivotally anchored, as at 22, to the hitch frame 18 and at its rear end is releasably connected to a lever 24 that is swingably carried by the hitch frame and operatively connected through linkage 25 with an arm 26 that is connected to the rock shaft 27 of the wheel carrier 17. Thus, extension and retraction of the cylinder 13 serves to raise and lower the frame relative to the ground engaging wheels 28 of the wheel carrier unit 17. The lever 24 is adapted to be locked in a frame-raised position by means of a lock-up link 30 (FIG. 1) connectible between the apertured upper end 29 of the lever 24 and a lock-up lug 31 on the main frame of the planter.

According to this invention, we provide means in the form of a retractable stand 35 that, when desired, may be shifted downwardly into a frame-supporting position (FIGS. 1 and 2) and, when so located, operation of the power cylinder 13 acts to tilt or rock the main frame about the stand as a fulcrum, thereby raising and lowering the front end of the draft frame 18 with respect to the tractor and thereby facilitating connecting and disconnecting the implement with respect to the tractor drawbar 15.

The stand 35 comprises a pair of rear legs 36 pivoted at their rear ends, as at 37, to the implement frame. The lower or forward ends of the legs 36 are pivoted, as at 38, to a generally horizontal foot piece 39. The stand 35 also includes a pair of forwardly extending legs 41 that are also pivoted to the foot piece 39, preferably at the pivots 38 that receive the lower forward portions of the rear legs 36. The upper ends of the forward legs 41 are formed with hooks 42 that are adapted to be engaged over a cross bar 43. The latter is carried in the lower portions of brackets 44 that are fixed to the sides of the hitch frame 18. In order to retain the hook ends 42 in position over the associated bar, apertured socket members 48 are fixed to the lower edges of the upper ends of the stand legs 41, closely adjacent the hook ends 42. When the ends 42 are hooked over the cross bar 43, quick detachable spring ring pins 49 are inserted in the apertures in the lugs 48 in such a way as to block the removal of the hook ends 42 from the cross bar 43, as best shown in FIG. 8.

When the stand 35 is to be supported in an upper or inoperative position, as shown in FIG. 3, the pins 49 are removed and the foot piece 39 raised until the hook ends 42 of the stand links 41 can be engaged over the cross bar structure 53 (FIGS. 3 and 9) carried by a cross plate 54 that supports the bracket 55 to which the forward end of the cylinder 13 is releasably connected. After the hook ends 42 are engaged over the cross bar structure 53, the pins 49 are reinserted, thus locking the strand in its inoperative or elevated position.

When the planter is not in use it is supported on the ground wheels 28 and the stand 35, as shown in FIG. 1, with the front legs 41 hooked over the rear cross bar 43 and locked in that position by the spring pins 49. As shown in FIG. 1, the tractor has been backed up to the planter so that the planter hitch is generally in line with the drawbar 15 of the tractor and closely adjacent to the clevis means 20.

The clevis means 20 is of special construction being particularly adapted for cooperation with the hitch stand 35 described above. The clevis means 20 comprises a bifurcated clevis member 70 (FIGS. 4–6) having upper and lower spaced apart sections 71 and 72 apertured vertically to receive a hitch pin 73. The rear portion of the clevis 70 is swingably mounted by a pivot bolt 74 in a selected pair of openings 75 formed in the forward ends of hitch plates 76 that are secured, as at 77, to the front ends of the hitch frame members 18. The rear end of the clevis member 70 (FIG. 6) is formed with upper and lower abutment sections 81 and 82 disposed generally on opposite sides of an opening 83 that receives the pivot bolt 74.

The purpose of the abutment structure just mentioned is to provide means for holding the clevis member 70 rigid with the planter hitch frame 18 when hitching the planter to the tractor, as best shown in FIGS. 1 and 2, it being desirable to hold the clevis 70 against swinging about the bolt 74 when backing the tractor drawbar into position between upper and lower bifurcated portions 71 and 72 of the clevis. However, after the planter is hitched and ready for operation, as shown in FIG. 3, it is desirable to permit the clevis 70 to pivot relative to the tractor hitch frame so as to accommodate relative movement between the planter and tractor when passing over uneven ground, such through swales, across ridges and the like, at which time it is necessary to permit the planter to swing up and down relative to the tractor.

For the purpose of acommodating varied heights of tractor drawbars, the clevis 70 may be disposed in a plurality of vertical positions relative to the hitch frame, by virtue of the several pairs of openings 75. That is, the clevis hitch pivot pin 74 may be disposed in either the lower openings, the upper openings, or the intermediate openings, but in any case whenever it is desired to have the clevis 70 rigid with a planter hitch frame, the clevis pin 73 may be disposed in the adjacent set of openings 75 and cooperate either with the upper abutment section 81 or the lower abutment section 82 to hold the clevis rigid as shown in FIGS. 1 and 2, the clevis 70 is held rigid by disposing the hitch pin 73 in the upper openings 75 in the plates 76. After the tractor is backed into position (FIG. 3), the hitch pin 73 is removed from the plates 76 and inserted through the vertical openings 80 (FIGS. 4 and 6) in the upper and lower sections 71 and 72 of the clevis member so as to complete the hitching of the implement to the tractor.

The operation of the above-described device is substantially as follows.

Assuming that the planter has been supported on the ground wheels and the stand, as shown in FIG. 1, first, the tractor is backed up to the planter to bring the tractor drawbar into line with the planter hitch, with the rear end of the drawbar close to the clevis member 70. This disposes the tractor in a position so that the remote cylinder 13 may be carried back and installed in place on the planter, as illustrated in FIG. 2. The front end of the cylinder 13 is connected with the bracket 55 and the rear or piston end of the cylinder with the lever means 24. Unless it has been done previously, the clevis pin 73 is now removed from the holes 80 in the clevis portions 71 and 72 and placed in the hitch extension holes 75, preferably whichever set is adjacent the rear end of the clevis 70. If the clevis 70 is installed in the upper holes, the clevis pin 73 is placed in the next lower holes and if the clevis is to be installed in the lowermost holes 75, the lock pin 73 is placed in the next upper holes.

Next, the power cylinder 13 is then extended or retracted as required, and this raises or lowers the ground wheels 28 so that the planter is, in effect, rocked about the stand 35 as a fulcrum, raising and lowering the rear portion of the planter which results in lowering or raising the front end of the hitch frame 18 to the position desired. Thus, by suitably operating the power means on the tractor, the front end of the planter hitch raised or lowered so as to bring the clevis 70 to the same height as the drawbar, after which the tractor is then backed to bring the drawbar in position between the upper and lower portions 71 and 72 of the clevis 70. Since in the arrangement shown the power cylinder 13 is controlled from the tractor, the cylinder may be extended or retracted, as necessary, while backing the tractor to bring the drawbar 15 into position in the clevis 70. After this operation is completed the tractor operator dismounts from the tractor, removes the clevis pin 73 from the holes 75 and inserts the pin 73 through the holes 80 in the clevis and the hole 86 in the rear end of the tractor drawbar 15. Thus, the planter is now connected or hitched to the tractor, but the stand 35 is still in a lowered position.

To provide for raising the stand to an inoperative position, the cylinder is extended, which forces the ground wheels 28 downwardly and raises the planter off the stand 35, the planter now being supported on the rear ground wheels 28 and on the drawbar 15 of the tractor. The stand may then be manually lifted up into its inoperative position and secured in that position, as described above, by hooking the ends 42 of the legs 41 over the cross bar 53. The planter is now ready for operation.

To disconnect the planter from the tractor, as when it is desired to use the latter from some other service, the planter may be supported on the stand and ground wheels by substantially a reverse of the operations mentioned above. Briefly, when the outfit has been driven to the point where it is desired to leave the planter, the cylinder is fully extended, which raises the planter frame off the ground the full amount possible and then the legs 41 of the stand are released from the forward cross member 53 and dropped downwardly until the upper ends of the stand links 41 can be hooked over the cross piece 43 and locked in that position. Then the cylinder is retracted an amount sufficient to raise the wheels 28 until the latter and the stand support the weight of the planter. The cylinder may now be retracted or extended, as necessary to relieve the clevis 70 of any weight of the planter. The hitch pin 73 may then be removed from the clevis 70 and the tractor driven forwardly a few inches to permit the clevis 70 to clear the tractor drawbar. Next, the cylinder is extended the full amount and then the wheel frame 17 locked in that position (FIG. 1) by engaging the lock-up link 30 with the upper end of the lever 24 and the lock-up lug 31, after which the cylinder 13 may then be removed from the planter, placed on the tractor and the latter driven away.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. An agricultural implement adapted normally to be hitched to a tractor having a drawbar and power means including a remote cylinder adapted to be mounted on an implement and deriving operating energy from said tractor power means, said implement comprising a frame including a main frame portion and a forwardly extending hitch frame portion, a clevis adapted to be connected with the tractor drawbar and pivoted to the forward end of the hitch frame portion for movement relative thereto about a transverse axis so as to accommodate up and down swinging of the implement relative to the tractor in normal operation, said clevis having surfaces disposed above and below the transverse axis, a wheel carrier mounted on the implement frame and having ground wheels shiftable generally vertically relative to the implement frame for raising and lowering the latter, a generally vertically retractable stand carried by the implement frame forwardly of said wheel carrier and disposed rearwardly of said clevis, means detachably connecting said remote cylinder to said implement frame to act between said wheel carrier and said implement frame for shifting the wheel carrier so as to shift the implement about said stand as a fulcrum and thus raise and lower the front end of the hitch frame to bring the clevis to substantially the same level as the tractor drawbar, to thereby facilitate connecting the latter and said clevis, means adapted to temporarily abuttingly engage one of the surfaces of the clevis and the hitch frame portion to hold the clevis against shifting about said transverse axis to facilitate maneuvering the clevis and drawbar, one relative to the other, to facilitate hitching the clevis to the tractor drawbar said engaging means including a pin, and said pin being insertible in the forward position of said clevis and the tractor drawbar for completing the connection of the implement to the tractor.

2. In an agricultural implement having a hitch frame adapted to be connected with the drawbar of a propelling tractor, the improvement comprising a clevis having a forward bifurcated portion adapted to receive said tractor drawbar between the bifurcations thereof, the latter being apertured to receive a detachable hitch pin connecting the clevis to the tractor drawbar, a transversely disposed aperture in the rear portion of said clevis, surfaces disposed above and below said aperture, a pair of forwardly extending vertically disposed hitch plates rigidly secured to the hitch frame, each of said plates having a plurality of apertures disposed in a substantially vertically extending line, each of the apertures in one plate being alined with the corresponding aperture in the other plate, the distance between the aperture in the rear portion of the clevis and said surfaces being substantially equal to the distance between the apertures in said plates, pivot pin means disposed through one set of alined apertures in said plates and through the transversely disposed aperture in the rear portion of the clevis, said pivot pin holding the clevis to the hitch frame for swinging movement about a transverse axis, one of the other sets of alined apertures being adapted to receive said detachable hitch pin for abutting engagement with one of said surfaces for holding said clevis against swinging about said pivot pin.

References Cited in the file of this patent
UNITED STATES PATENTS

| | | |
|---|---|---|
| 1,574,351 | Altgelt | Feb. 23, 1926 |
| 1,655,351 | Altgelt | Jan. 3, 1928 |
| 1,958,114 | Robinson | May 8, 1934 |
| 2,452,267 | Schramm | Oct. 26, 1948 |
| 2,474,483 | Luttrell | June 28, 1949 |
| 2,540,100 | Coeur | Feb. 6, 1951 |
| 2,780,475 | Koerner | Feb. 5, 1957 |
| 2,805,083 | Sherwen | Sept. 3, 1957 |
| 2,833,562 | Francois | May 6, 1958 |
| 2,863,670 | Larson | Dec. 9, 1958 |
| 2,952,472 | McNeill | Sept. 13, 1960 |